United States Patent

Dishner et al.

[11] Patent Number: 5,879,055
[45] Date of Patent: Mar. 9, 1999

[54] AUTOMATIVE SEAT BACK PANEL

[75] Inventors: George E. Dishner, Davison; Kirk P. Koenig, Waterford; Dave Solak, Saginaw; Ricardo O. Quincoses, Grand Blanc; Mark Alan Farquhar, Ortonville; William G. McPherson, Grand Blanc, all of Mich.

[73] Assignee: Lear Corporation, Southfield, Mich.

[21] Appl. No.: 805,112

[22] Filed: Feb. 24, 1997

Related U.S. Application Data

[60] Provisional application No. 60/025,313 Sep. 24, 1996.

[51] Int. Cl.$^6$ ..................................................... A47C 7/00
[52] U.S. Cl. ............................... 297/452.38; 297/452.59; 297/440.2; 297/218.3
[58] Field of Search ......................... 297/452.58, 452.59, 297/218.5, 218.3, 218.1, 452.38, 440.2

[56] References Cited

U.S. PATENT DOCUMENTS

| | | | |
|---|---|---|---|
| 2,284,957 | 6/1942 | Gedris | 297/452.59 |
| 2,490,763 | 12/1949 | Winberg | 297/218.1 |
| 2,535,463 | 12/1950 | Stubnitz . | |
| 3,075,862 | 1/1963 | Hoyer . | |
| 3,628,830 | 12/1971 | Mitjans | 297/218.3 X |
| 3,663,057 | 5/1972 | Lohr et al. | 297/452.38 X |
| 3,695,707 | 10/1972 | Barecki et al. . | |
| 3,871,041 | 3/1975 | Plume . | |
| 3,873,155 | 3/1975 | Barecki . | |
| 3,981,534 | 9/1976 | Wilton . | |
| 4,019,776 | 4/1977 | Takamatsu . | |
| 4,040,660 | 8/1977 | Barecki . | |
| 4,186,966 | 2/1980 | Harder, Jr. . | |
| 4,265,483 | 5/1981 | Raftery et al. . | |
| 4,275,925 | 6/1981 | Harder , Jr. . | |
| 4,365,840 | 12/1982 | Kehl et al. . | |
| 4,390,210 | 6/1983 | Wisniewski et al. . | |
| 4,544,205 | 10/1985 | Molnar . | |
| 4,580,837 | 4/1986 | Bayley . | |
| 4,643,480 | 2/1987 | Morita . | |
| 4,715,651 | 12/1987 | Wakamatsu | 297/218.1 |
| 4,740,035 | 4/1988 | Kazaoka et al. . | |
| 4,792,189 | 12/1988 | Shovar . | |
| 4,834,451 | 5/1989 | Meunier et al. | 297/452.59 X |
| 4,836,609 | 6/1989 | Hill | 297/452.38 X |
| 4,844,546 | 7/1989 | Hanai . | |
| 4,850,644 | 7/1989 | Kazaoka et al. | 297/452.59 X |

(List continued on next page.)

FOREIGN PATENT DOCUMENTS

| | | | |
|---|---|---|---|
| 125598 | 11/1984 | European Pat. Off. | 297/218.3 |
| 194923 | 3/1923 | United Kingdom | 297/218.5 |

*Primary Examiner*—Peter M. Cuomo
*Assistant Examiner*—David E. Allred
*Attorney, Agent, or Firm*—MacMillan, Sobanski & Todd, LLC

[57] ABSTRACT

An automotive seat assembly including a seat bottom and a seat back pivotally attached to the seat bottom. The seat back includes a rigid seat back frame supporting a contoured foam cushion encapsulated in a trim cover material. A semi-rigid back panel, having a main body portion and a pair of side portions, is mounted to the rear of the seat back to conceal the rear surface of the seat back frame. A pair of guide members are mounted to the seat back frame and a pair of positioners are mounted to the back panel for alignment and engagement with the guide members. The positioners have an opening for sliding around the guide members as the back panel is positioned onto the seat back frame. A fastening member is also secured to the seat back frame. The back panel also includes a receiving portion mounted adjacent the bottom of the back panel for encapsulating the fastening member which closes any gaps formed between the bottom of the back panel and the seat back frame. A trim retention device is attached to a portion of the trim cover material. A receiving bracket is also mounted to the back panel for engaging the trim retention device to secure the trim cover to the panel. The engagement of the receiving bracket and the trim retention device prevents separation of the trim cover material and the foam cushion from the seat frame.

15 Claims, 7 Drawing Sheets

U.S. PATENT DOCUMENTS

| | | | |
|---|---|---|---|
| 4,900,085 | 2/1990 | Tobler | 297/452.38 |
| 5,048,894 | 9/1991 | Miyajima et al. | 297/452.59 X |
| 5,064,247 | 11/1991 | Clark et al. | 297/452.38 X |
| 5,067,772 | 11/1991 | Koa . | |
| 5,067,773 | 11/1991 | Koa . | |
| 5,102,196 | 4/1992 | Kaneda et al. | 297/452.38 X |
| 5,251,963 | 10/1993 | Inayoshi et al. . | |
| 5,326,155 | 7/1994 | Wild . | |
| 5,407,247 | 4/1995 | Forcier et al. . | |
| 5,522,645 | 6/1996 | Dahlbacka . | |

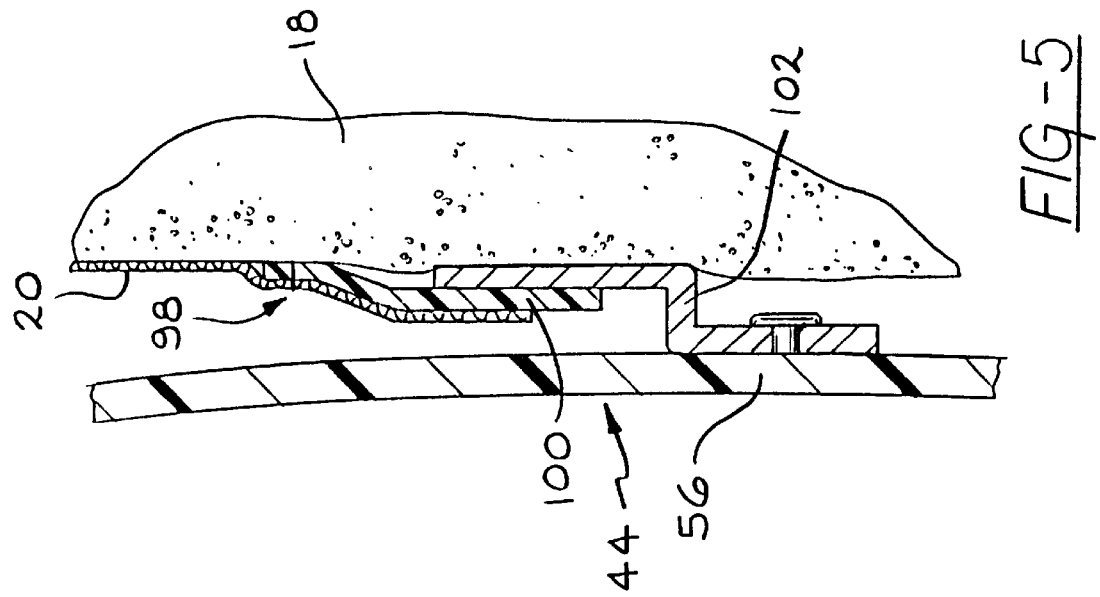
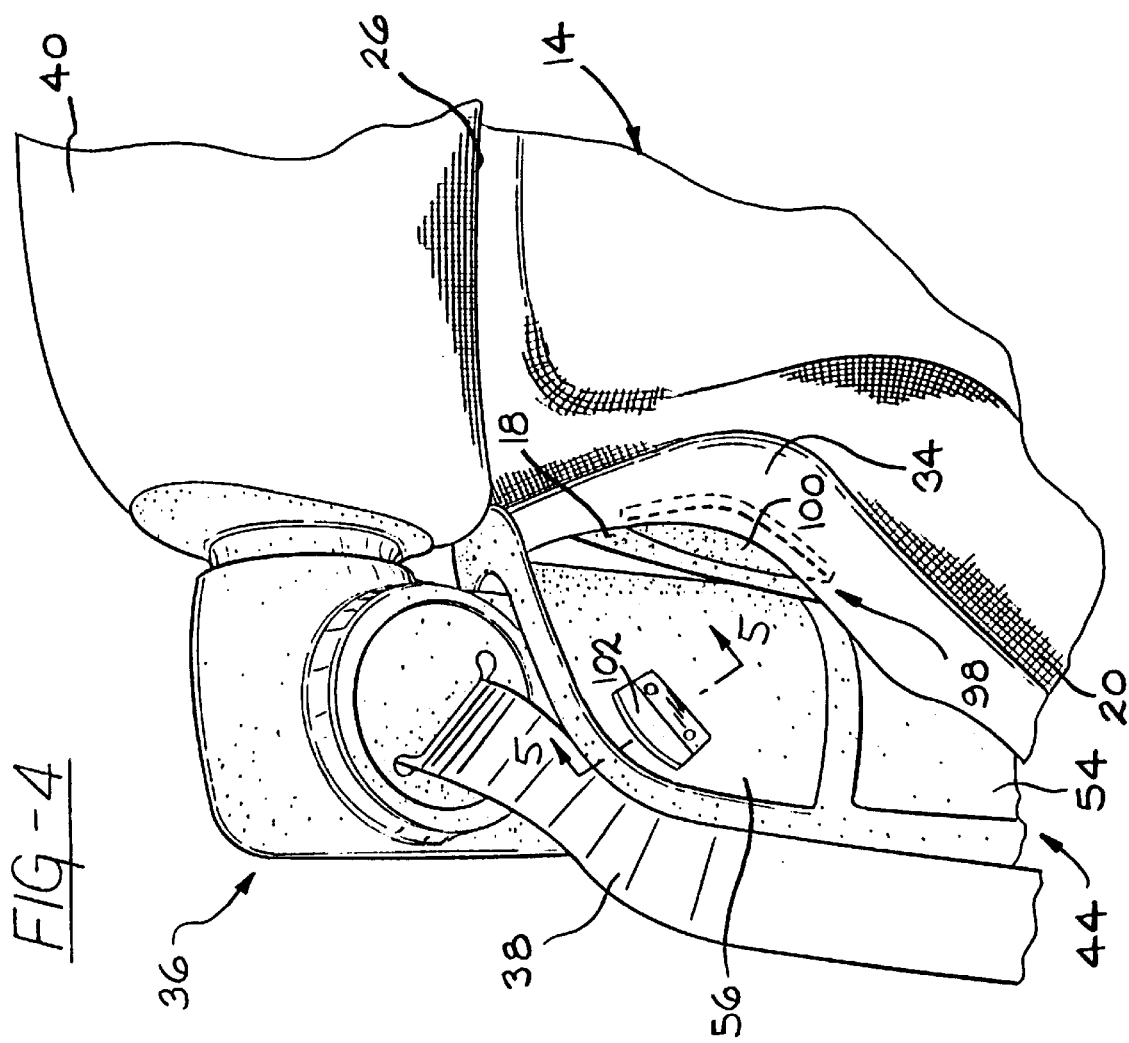

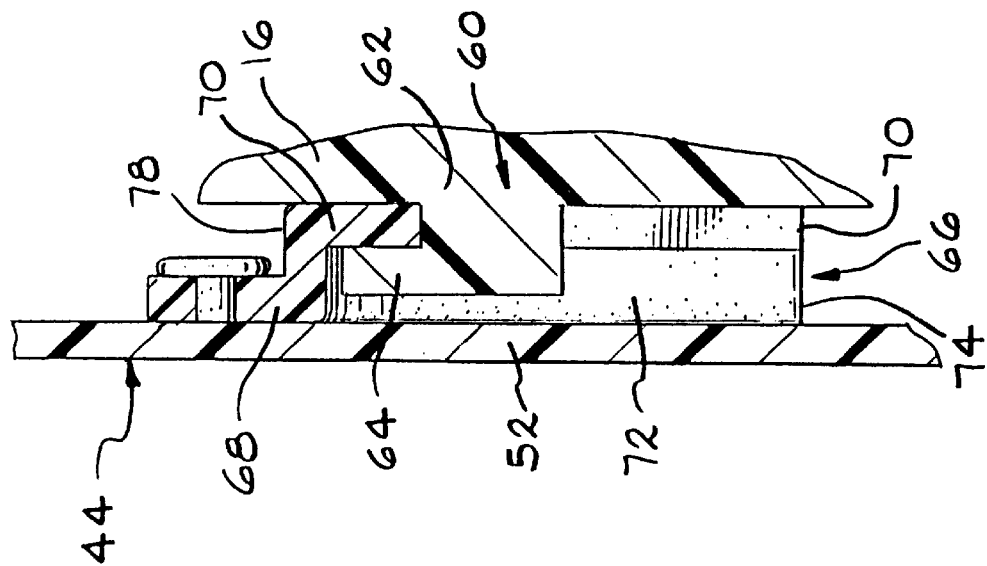
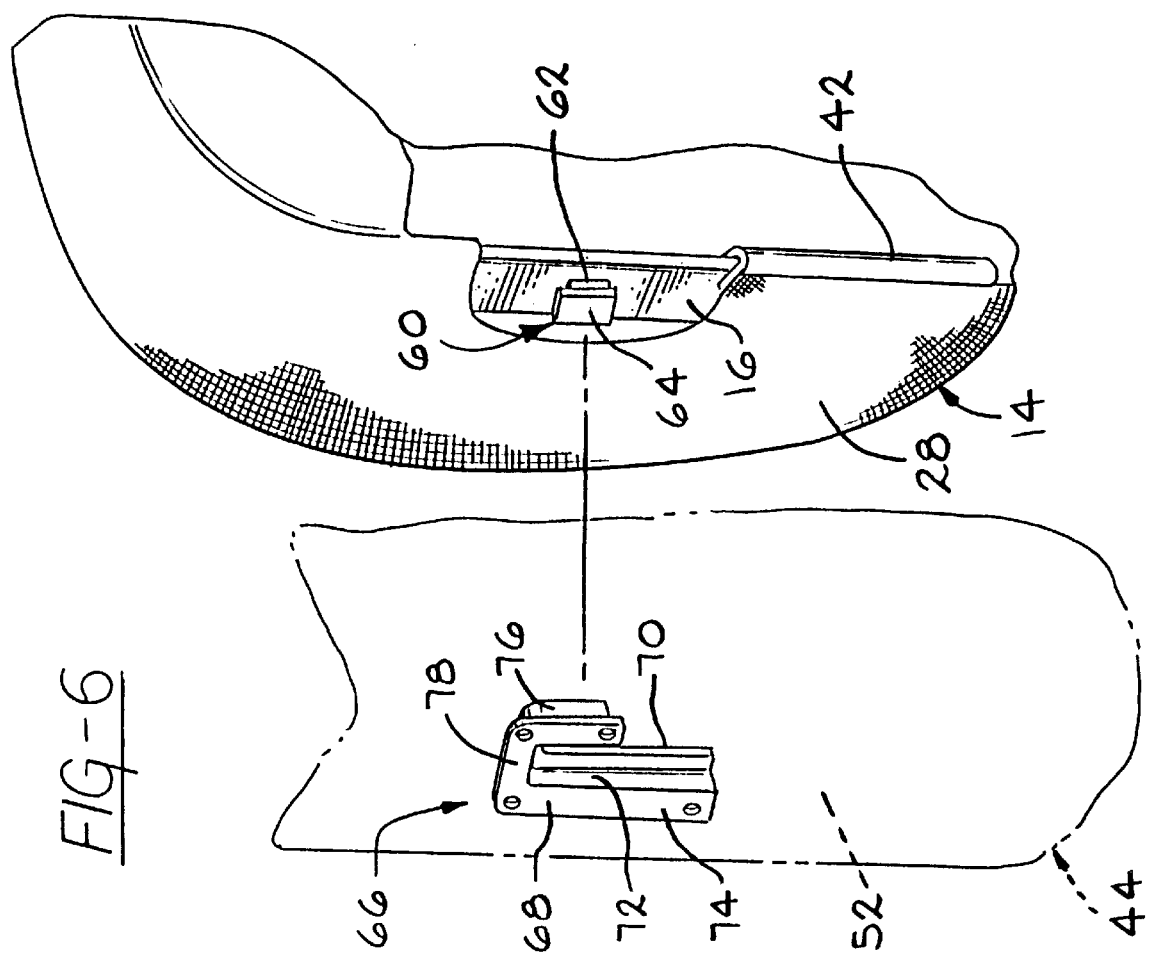

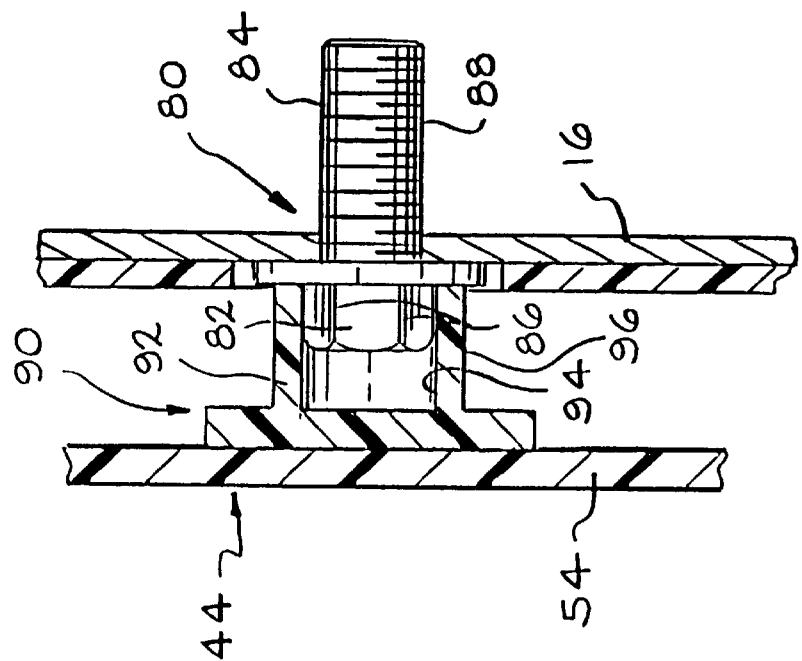
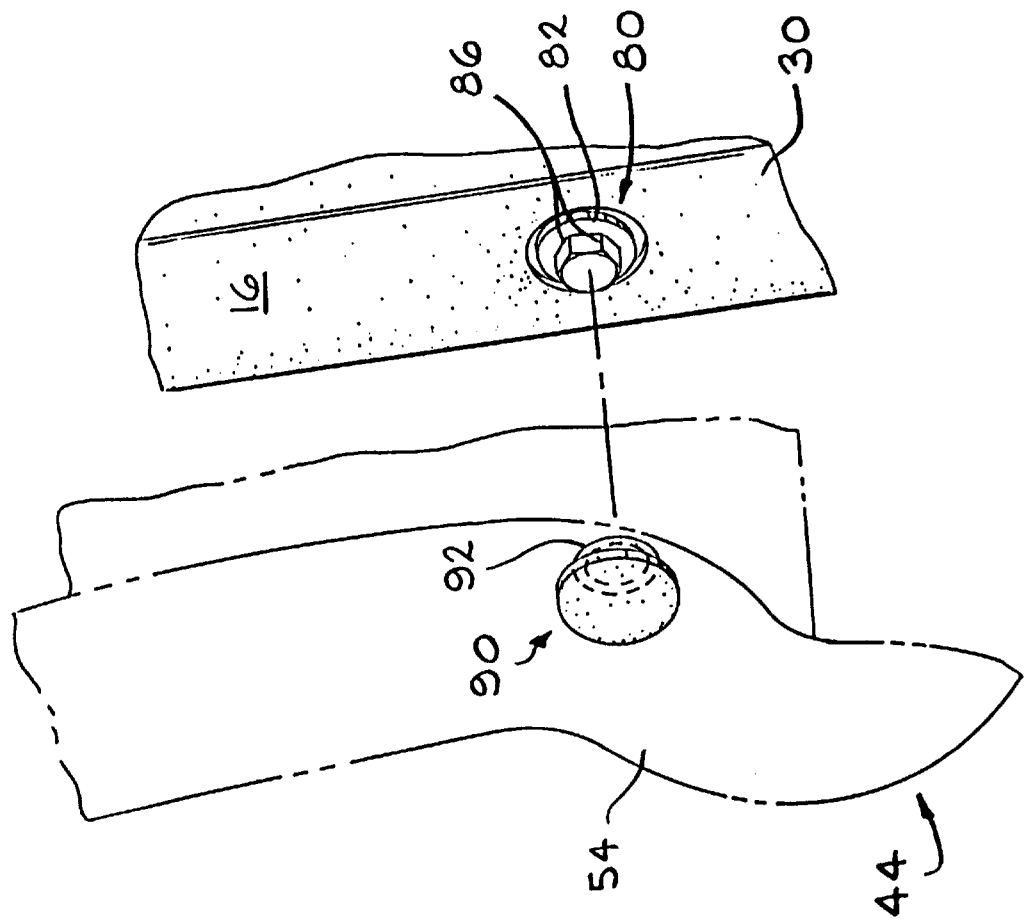

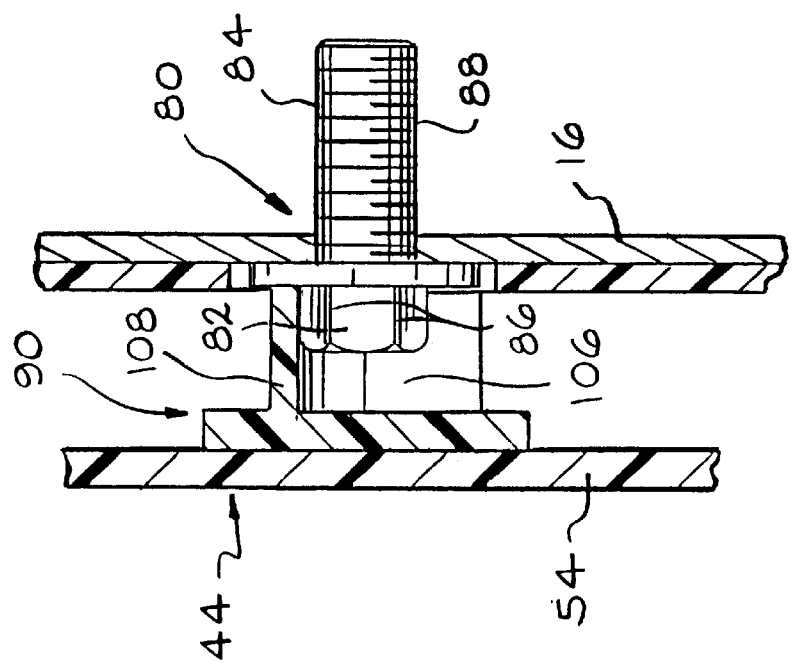
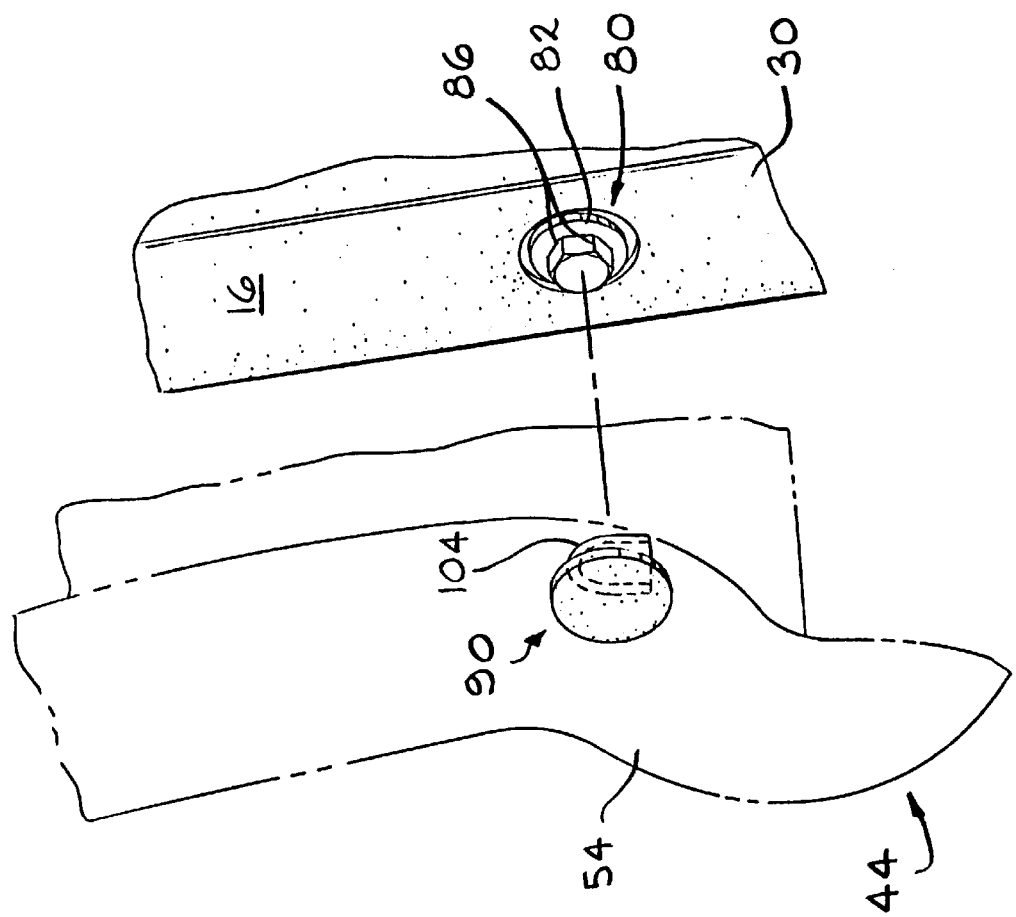

AUTOMATIVE SEAT BACK PANEL

RELATED APPLICATION

This patent application claims priority to and all of the benefits of co-pending United States provisional patent application serial number 60/025,313 which was filed on Sep. 24, 1996 and is entitled "All Belts to Seat Assembly."

TECHNICAL FIELD

The subject invention relates to back panels for automotive seat assemblies. In particular the subject invention relates to a number of attachment devices for securing the back panel to the seat assembly and a retaining device for securing a trim cover material to the back panel.

BACKGROUND OF THE INVENTION

Automotive seat assemblies typically include a seat bottom and a seat back pivotally attached to the seat bottom. The seat back comprises a rigid seat back frame supporting a contoured foam cushion encapsulated in a trim cover material. Semi-rigid back panels are mounted to a rear surface of the seat back in certain applications. The back panel conceals a rear surface of the seat back frame, the rear of the foam cushion, a portion of the trim cover material, and any other interior components of the seat back. In these type of seating configurations, the trim cover is stretched over a front surface of the seat back and then secured to the rear surface of the seat back frame by a number of trim attachment strips. The back panel is typically secured to the rear surface of the seat back frame by a number of christmas tree type locking clips or screws. Once attached to the seat back frame, the back panels cannot be easily removed.

A current trend in the automotive industry is to move the entire seat belt structure onto the seat back to form an integral seat belt restraint assembly. These seat belt structures commonly include a telescoping tower which is vertically moveable between a lower position and an upper or raised position to provide selective adjustment or alignment with a seat occupant. Seats having these telescoping towers create a host of problems for manufactures. Some of the problems relate to the assembly, safety, reliability, added weight, and aesthetics of the seats. One of the assembly problems is effectively securing the semi-rigid back panel around the tower. A typical aesthetic problem is maintaining the desired spacing between the back panel and the seat back frame. Another aesthetic problem is protecting and concealing from view the number of internal components needed to operate the tower assembly. Still yet another problem is that the trim cover material cannot be stretched around certain parts of the tower assembly. Hence, certain portions of the trim cover material cannot be securely attached to the rear surface of the seat back frame.

SUMMARY OF THE INVENTION AND ADVANTAGES

An automotive seat assembly comprising a seat back defining an occupant back support and including a seat back frame. A semi-rigid back panel has a main body portion and a pair of substantially parallel side portions. At least one guide member projects outwardly from either the seat back frame or the back panel. At least one positioner projects inwardly from either the seat back frame or the back panel for engaging the guide member. The positioner has an opening for slidably receiving the guide member as the back panel is positioned onto the seat back frame until the positioner secures the back panel to the seat back with the back panel covering at least a portion of the seat back frame.

The automotive seat assembly also comprises a seat back defining an occupant back support and including a seat back frame. A fastening member has an outwardly projecting portion and an engagement portion. The engagement portion of the fastening member is secured to the seat back frame. A semi-rigid back panel has a top and a bottom with a main body portion and a pair of substantially parallel side portions. The back panel includes a receiving portion mounted adjacent the bottom of the back panel for encapsulating the projecting portion of the fastening member after the back panel is secured to the seat back frame for positioning at least a portion of the bottom of the back panel to close any gaps formed between the bottom of the back panel and the seat back frame.

In addition, the automotive seat assembly comprises a seat frame and a foam cushion supported by the seat frame. A trim cover material surrounds the foam cushion and at least a portion of the seat frame. A trim retention device is attached to a portion of the trim cover material. A semi-rigid panel surrounds at least a portion of the seat frame and the trim cover material and has a receiving bracket for engaging the trim retention device to secure the trim cover to the panel. The engagement of the receiving bracket and the trim retention device prevents separation of the trim cover material and the foam cushion from the seat frame.

Accordingly, the subject invention overcomes the common deficiencies encountered with seating assemblies incorporating an integral seat belt restraint assembly. Specifically, the subject invention incorporates a number of novel devices for attaching the back panel to the seat back frame and maintaining a desired spacing between the back panel and the seat back frame. The back panel of the subject invention also covers and conceals the working components of the tower assembly. The subject invention also includes a novel device for securing a portion of the trim cover material to the back panel to ensure that the trim cover material cannot be separated from the seat back frame.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a fragmentary perspective view of a corner section of the automotive seat assembly incorporating the subject invention;

FIG. 5 is a cross-sectional view taken along line 5—5 of FIG. 4;

FIG. 6 is a fragmentary perspective view of a side section of the automotive seat assembly;

FIG. 7 is a cross-sectional view taken along line 7—7 of FIG. 1;

FIG. 8 is another fragmentary perspective view of the side section of the automotive seat assembly; and FIG. 9 is a cross-sectional view taken along line 9—9 of FIG. 1.

FIG. 10 is a fragmentary perspective view of the side section of the automotive seat assembly incorporating an alternative embodiment of the invention.

FIG. 11 is a cross-sectional view of the alternative embodiment of FIG. 10.

DETAILED DESCRIPTION OF THE PREFERRED EMBODIMENT

Figure 1:
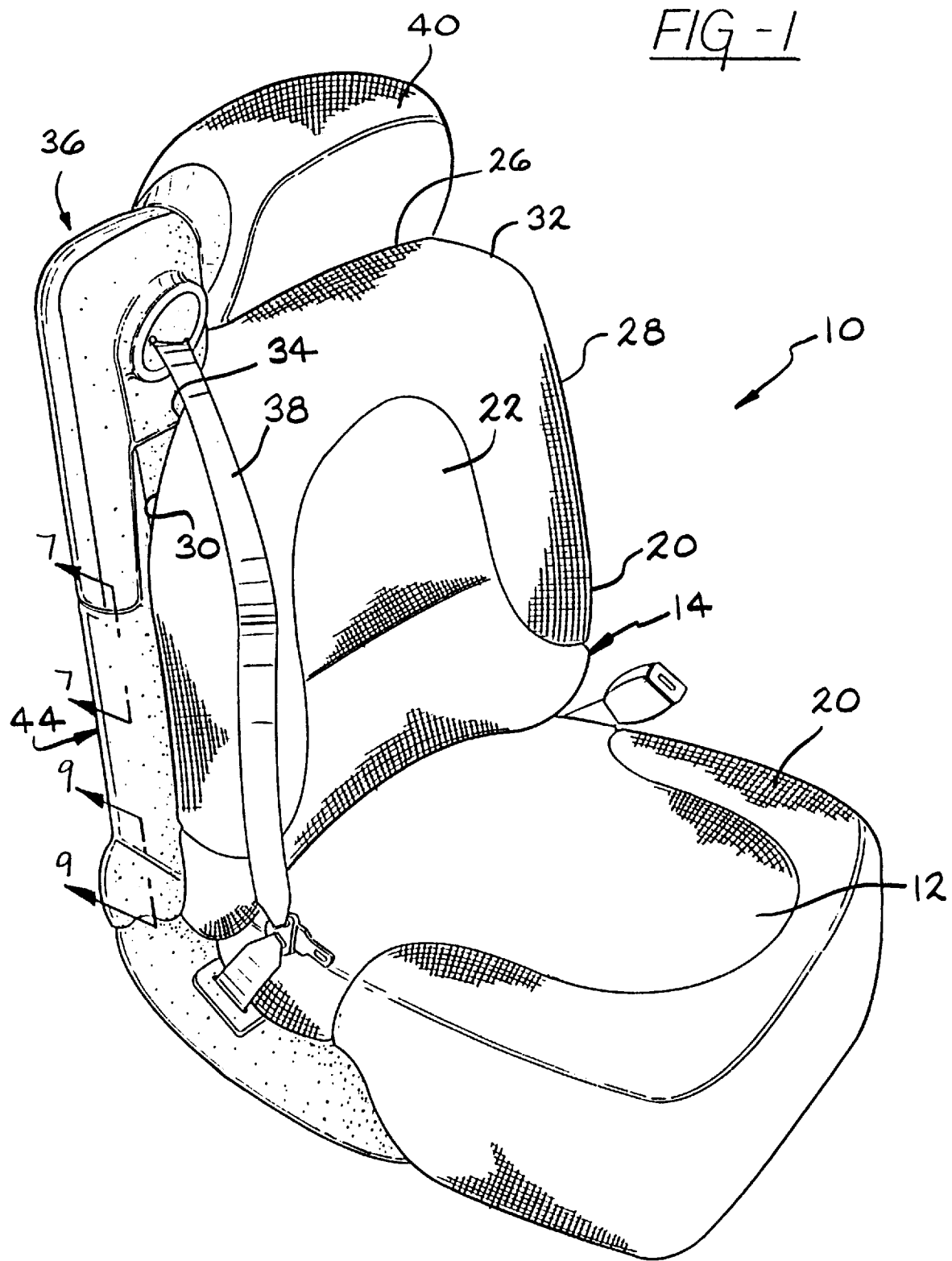
FIG. 1 is a perspective view of an automotive seat assembly incorporating the subject invention.
Figure 2:
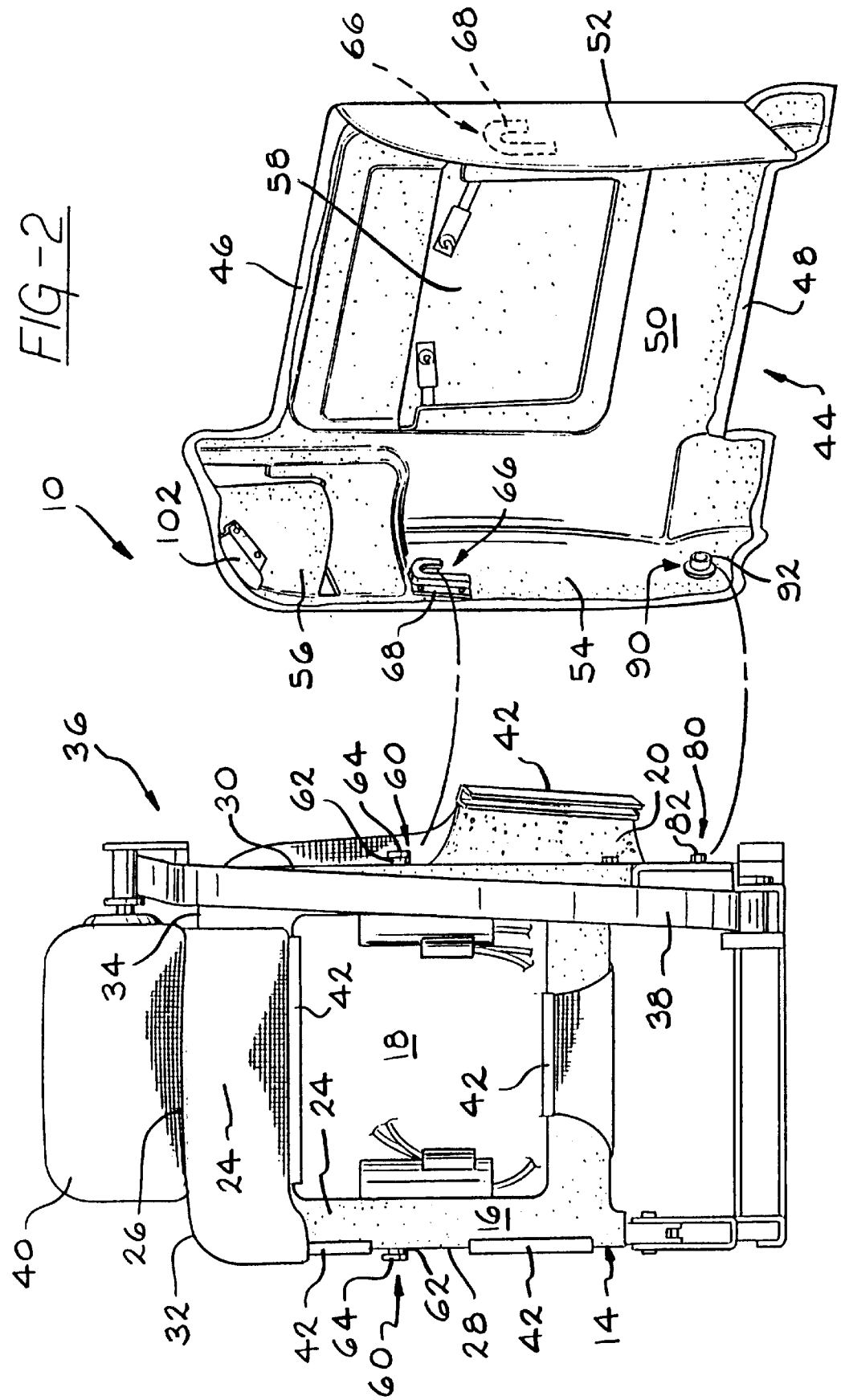
FIG. 2 is a perspective view of the subject invention in exploded relationship to the automotive seat assembly.
Figure 3:
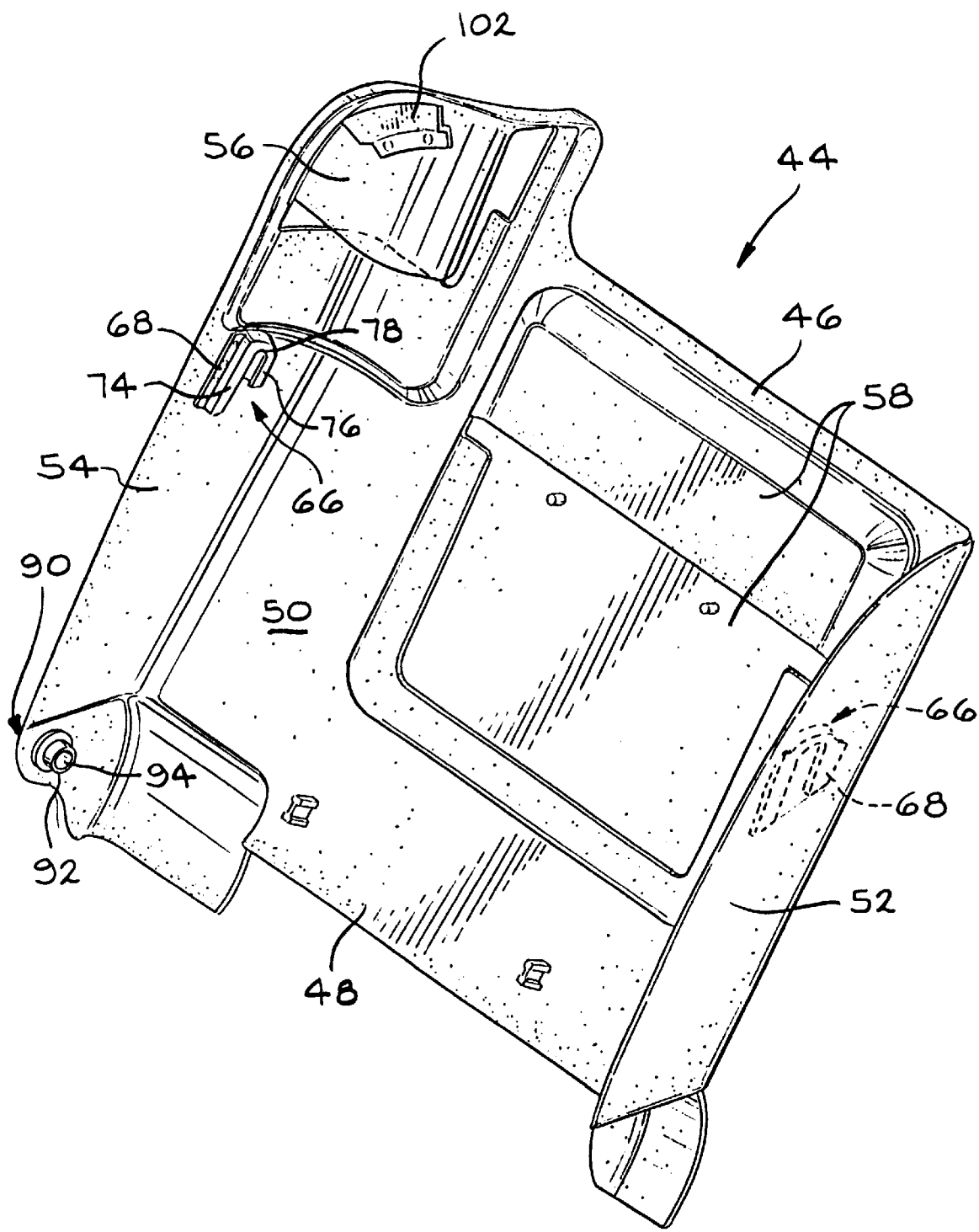
FIG. 3 is a perspective view of the subject invention.

Referring to the Figures, wherein like numerals indicate like or corresponding parts throughout the several views, an automotive seat assembly is generally shown at 10 in FIGS. 1 and 2. The seat assembly 10 comprises a seat bottom 12 and a seat back 14, defining an occupant back support, pivotally attached to the seat bottom 12. The seat back 14 includes a rigid seat back frame 16 supporting a contoured foam cushion 18 encapsulated in a trim cover material 20. The seat back frame 16 has a front surface 22 and a rear surface 24 with a top surface 26 and first 28 and second 30 substantially parallel side surfaces which define first 32 and second 34 top corners. A plastic blow-molded cover surrounds the seat back frame 16 as is well known in the art. The seat back frame 16 also supports a plurality of accessories (not shown) including, for example, a lumbar support and seat heater.

A telescoping tower assembly, generally shown at 36, is mounted to one of the side surfaces 28, 30 of the seat back frame 16. The seat assembly 10 shown in the Figures is a passenger side front seat with the tower assembly 36 mounted along the second side surface 30 and the second top corner 34 of the seat back 14. Other seat assemblies within a vehicle will not be discussed as it is understood that they are substantially the same as the seat assembly described hereinbelow. The tower assembly 36 utilizes a number of moveable parts (not shown), such as a drive motor and interlocking tracks, for vertically moving the tower 36 between a lower position and an upper or raised position to provide selective adjustment or alignment with a seat occupant (not shown). The tower assembly 36 supports a seat belt restraint 38 and a cantilevered headrest 40. Accordingly, the vertical movement of the tower assembly 36 adjusts and aligns the seat belt restraint 38 and the headrest 40 with the seat occupant.

As best shown in FIG. 2, a number of trim attachment strips 42 are secured to the distal ends of the trim cover material 20. The trim cover material 20 is stretched over the contoured foam cushion 18 and the front surface 22 of the seat back frame 16. The attachment strips 42 are then mounted to the rear surface 24 of the seat back frame 16 to secure the trim cover material 20 to the seat back 14. More specifically, the trim cover material 20 extends around the top surface 26, at least a portion of the first 28 and second 30 side surfaces, and the first top corner 32 of the seat back frame 16 which adequately secures a majority of the trim cover material 20 to the seat back frame 16. The trim cover material 20 cannot, however, stretch around the second top corner 34 of the seat back frame 16 because of the numerous moveable parts of the tower assembly 36.

A semi-rigid back panel, generally shown at 44, is mounted to the rear of the seat back 14 to conceal the rear surface 24 of the seat back frame 16, the rear of the foam cushion 18, a portion of the trim cover material 20, the trim attachment strips 42 and the other interior components of the seat back 14. The back panel 44 has a top 46 and bottom 48 with a main body portion 50 and first 52 and second 54 substantially parallel side portions. The main body portion 50 and side portions 52, 54 of the back panel 44 surround at least a portion of the seat back frame 16 and trim cover material 20. More specifically, the main body portion 50 overlays the rear surface 24 of the seat back frame 16 and the first 52 and second 54 side portions of the back panel 44 overlay the first 28 and second 30 side surfaces of the seat back frame 16, respectively. The second side portion 54 of the back panel 44 includes an integral shoulder section 56 extending above the first side portion 52 of the back panel 44. The shoulder section 56 wraps around at least a portion of the second top corner 34 of the front surface 22 of the seat back frame 16. The shoulder section 56 also wraps around a portion of the tower assembly 36 to cover and conceal at least a portion of the moveable parts of the tower assembly 36. The outer surface of the back panel 44 may be covered in the trim cover material and include such accessories as a magazine or storage compartment 58 formed therein.

As best shown in FIGS. 2, 3, 6 and 7, at least one guide member, generally shown at 60, projects outwardly from either the seat back frame 16 or the back panel 44. As shown in the preferred embodiment, the guide member 60 extends from the seat back frame 16. More specifically, a guide member 60 extends perpendicularly from each of the first 28 and second 30 side surfaces of the seat back frame 16. As appreciated by those skilled in the art, the guide member 60 could extend from any surface of the seat back frame 16 or from any portion of the back panel 44. Each guide member 60 includes a support post 62 extending transversely from the seat back frame 16 to a distal end. Each guide member 60 also includes a retaining flange 64 extending outwardly from the distal end of the support post 62 and extending substantially parallel to the seat back frame 16. The retaining flange 64 at least partially overlays the support post 62. As best shown in FIGS. 6 and 7, both the support post 62 and the retaining flange 64 have a rectangular configuration. As discussed above, the retaining flange 64 overlays and extends beyond the rectangular support post 62 which creates the necessary engagement surfaces for a positioner, generally shown at 66, projecting from either the seat back frame 16 or the back panel 44.

At least one positioner 66 projects inwardly from either the seat back frame 16 or the back panel 44 for engaging the guide member 60. As shown in the preferred embodiment, the positioner 66 extends from the back panel 44. More specifically, a positioner 66 is mounted to an inner surface of each of the side portions 52, 54 of the back panel 44 for alignment with the guide members 60 extending from the side surfaces 28, 30 of the seat back frame 16. As appreciated by those skilled in the art, the positioner 66 could extend from any surface of the seat back frame 16 or from any portion of the back panel 44 so long as the positioner 66 can adequately align with a corresponding guide member 60.

Each positioner 66 has an opening for slidably receiving the guide member 60 as the back panel 44 is positioned onto the seat back frame 16. The positioner 66 slides about the guide member 60 until the positioner 66 secures the back panel 44 to the seat back 14 with the back panel 44 covering at least a portion of the seat back frame 16. Each positioner 66 includes a substantially J-shaped catch 68 defining the opening for slidably receiving and engaging the guide member 60. The J-shaped catch 68 projects inwardly from the inner surface of the back panel 44 and includes a rim portion 70 for creating a slot 72 within the catch 68, the guide member 60 slides within the slot 72 and the rim portion 70 at least partially surrounds the guide member 60. The J-shaped catch 68 has a long leg 74 and a short leg 76 with the guide member 60 secured between the long 74 and short 76 legs. The long 74 and short 76 legs are connected by a substantially flat bottom 78 which creates the rectangular shaped slot 72 as shown in the preferred embodiment.

As appreciated by those skilled in the art, the shape of the slot 72 may be of any suitable design so long as the guide member 60 can be adequately retained therein. The rectangular shaped retaining flange 64 and the rectangular shaped support post 62 mate with the rectangular shaped slot 72 wherein the rim portion 70 slides within the engagement surfaces of the guide member 60 to adequately secure the back panel 44 to the seat back frame 16.

The sliding feature of the positioners 66 and guide members 60 is critical to the effective mounting of the back panel 44. During installation of the back panel 44, the shoulder section 56 must first be positioned around the tower assembly 36. The back panel 44 then slides downwardly into position with the shoulder section 56 wrapping around the tower assembly 36 and a portion of the seat back frame 16. As the back panel 44 slides downwardly, the J-shaped catches 68 automatically engage the guide members 60 and automatically secure the back panel 44 to the seat back frame 16. As discussed in the background section, common fasteners for back panels are christmas tree type fasteners that project inwardly from the back panel. These other types of fasteners are not as effective because they would force the main body portion and/or the side portions of the back panel outwardly as the shoulder section of the back panel slides into position. In addition, the positioners 66 and the guide members 60 of the subject invention allow for removal of the back panel 44 without damaging any portion of the back panel 44.

Another feature of the subject invention is best shown in FIGS. 2, 3, 8, and 9. This feature includes a fastening member, generally shown at 80, having an outwardly projecting portion 82 and an engagement portion 84. The fastening member 80 is mounted to at least one of the side surfaces 28, 30 of the seat back frame 16. The outwardly projecting portion 82 has a polygon configuration with a plurality of crests 86. More specifically, the outwardly projecting portion 82 has a hexagon shape with six corresponding crests 86. The engagement portion 84 of the fastening member 80 is secured to the seat back frame 16. The engagement portion 84 extends from the projecting portion 82 and includes a plurality of threads 88 for threading engagement with the seat back frame 16. As appreciated by those skilled in the art, the fastening member 80 of the subject invention is commonly known as a bolt with machine type threads. The fastening member 80, however, may be of any suitable design so long as there is an outwardly projecting portion mounted to the seat back frame.

The back panel 44 includes a receiving portion, generally shown at 90, mounted adjacent the bottom 48 of the back panel 44 for at least partially encapsulating the projecting portion 82 of the fastening member 80 after the back panel 44 is secured to the seat back frame 16. The receiving portion 90 positions at least a portion of the bottom 48 of the back panel 44 to close any gaps formed between the bottom 48 of the back panel 44 and the seat back frame 16. In the preferred embodiment, the receiving portion 90 includes an annular sleeve 92 having an inner surface 94 and an outer surface 96 with the inner surface 94 of the annular sleeve 92 engaging and completely surrounding the projecting portion 82 of the fastening member 80. More specifically, the crests 86 of the outwardly projecting portion 82 frictionally engage the inner surface 94 of the annular sleeve 92. The receiving portion 90 is mounted to an inner surface of one of the side portions 52, 54 of the back panel 44 for alignment with the fastening member 80 extending from one of the side surfaces 28, 30 of the seat back frame 16. Also, in the preferred embodiment, the outwardly projecting portion 82 is mounted to the second side surface 30 of the seat back frame 16 and the receiving portion 90 is mounted to the second side portion 54 of the back panel 44 for alignment with the projecting portion 82. However, as appreciated by those skilled in the art, there could be multiple receiving portions 90 mounted anywhere on the back panel 44 so long as there is a corresponding projecting portion 82 on the seat back frame 16.

FIGS. 10 and 11 disclose an alternative embodiment of the receiving portion 90 wherein like numerals indicate like or corresponding parts. The receiving portion 90 includes a U-shaped locator 104 having an inner surface 106 and an outer surface 108 with the inner surface 106 of the U-shaped locator 104 engaging and at least partially surrounding the projecting portion 82 of the fastening member 80. More specifically, the crests 86 of the outwardly projection portion 82 frictionally engage the inner-surface 106 of the U-shaped locator 104. The remaining features of this alternative embodiment are substantially the same as in the preferred embodiment.

Yet another feature of the subject invention is best shown in FIGS. 2, 3, 4, and 5. This feature includes a trim retention device, generally shown at 98, attached to a portion of the trim cover material 20. Specifically, the trim retention device 98 comprises a thin plate 100 fixedly attached to a distal end of the trim cover material 20. Even more specifically, the trim retention device 98 is attached to the trim cover material 20 near the second top corner 34 of the seat back frame 16.

A receiving bracket 102 for engaging the trim retention device 98 is mounted to the back panel 44. FIG. 4 is a detail of the second top corner 34 of the seat back frame 16 with the foam cushion 18 and trim cover material 20 pulled away from the seat back frame 16 to clearly illustrate the mounting position of the receiving bracket 102. Also, FIG. 4 clearly shows the back panel 44 protecting and concealing any exposed parts of the tower assembly 36. The receiving bracket 102 secures the trim cover material 20 to the back panel 44. The engagement of the receiving bracket 102 and the trim retention device 98 prevents separation of the trim cover material 20 and the foam cushion 18 from the seat back frame 16. Specifically, the receiving bracket 102 is attached to the shoulder section 56 of the second side portion 54 of the back panel 44 which secures the trim cover material 20 to the shoulder section 56 of the back panel 44 thereby assuring that the trim cover material 20 and the foam cushion 18 are adequately secured to the second top corner 34 of the seat back frame 16. As disclosed above, the trim cover material 20 cannot extend around the second top corner 34 of the seat back frame 16 because of the tower assembly 36. Hence, the trim retention device 98 and receiving bracket 102 are critical to an overall effective design of the seat back 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An automotive seat assembly comprising:

a seat back defining an occupant back support and including a seat back frame having a front surface, a rear surface, and first and second side surfaces;

a cushion supported on said front surface of said seat back frame;

a trim cover material covering said seat cushion and at least a portion of each of said first and second side surfaces of said seat back frame;

a semi-rigid back panel having a substantially planar main body portion and a pair of substantially parallel side portions projecting substantially perpendicular to said main body portion;

at least one guide member projecting from one of a side surface of said seat back frame or a complementary side portion of said back panel in a first direction;

at least one positioner projecting from the other of said side surface of said seat back frame or said complemented side portion of said back panel in a second direction opposite said first direction and engaging said guide member, said positioner including a slot having a downwardly facing opening slidably receiving said guide member as said back panel is positioned onto said seat back frame until said positioner secures said back panel to said seat back and said guide member is retained in said slot so that said main body of said back panel covers at least a portion of said rear surface of said seat back frame and so that said side portions of said back panel cover said trim cover material on said side surfaces of said seat back frame.

2. An assembly as set forth in claim 1 wherein said guide member includes a support post extending from one of said seat back frame or said back panel to a distal end.

3. An assembly as set forth in claim 2 wherein said guide member includes a retaining flange extending from said distal end of said support post.

4. An assembly as set forth in claim 3 wherein said retaining flange at least partially overlays said support post.

5. An assembly as set forth in claim 1 wherein said positioner includes a substantially J-shaped catch defining said opening for slidably receiving and engaging said guide member.

6. An assembly as set forth in claim 5 wherein said J-shaped catch includes a rim portion for creating a slot within said catch, said guide member slides within said slot and said rim portion at least partially surrounds said guide member.

7. An assembly as set forth in claim 6 wherein said J-shaped catch has a long leg and a short leg with said guide member secured between said long and short legs.

8. An assembly as set forth in claim 1 wherein said guide member extends from said seat back frame and said positioner extends from said back panel.

9. An assembly as set forth in claim 8 wherein said seat back frame side surfaces are substantially parallel to each other, and a guide member extends perpendicularly from each of said side surfaces of said seat back frame.

10. An assembly as set forth in claim 9 wherein a positioner is mounted to an inner surface of each of said side portions of said back panel for alignment with said guide members extending from said side surfaces of said seat back frame.

11. An assembly as set forth in claim 1 including a fastening member having an outwardly projecting portion and an engagement portion, wherein said engagement portion is secured to said seat back frame; and said back panel includes a receiving portion mounted adjacent a bottom of said back panel for at least partially encapsulating said projecting portion of said fastening member after said back panel is secured to said seat back frame, thus positioning at least a portion of said bottom of said back panel adjacent said seat back frame.

12. An assembly as set forth in claim 11 wherein said receiving portion includes an annular sleeve having an inner surface and an outer surface with said inner surface of said annular sleeve engaging and completely surrounding said projecting portion of said fastening member.

13. An assembly as set forth in claim 11 wherein said receiving portion includes a U-shaped locator having an inner surface and an outer surface with said inner surface of said U-shaped locator engaging and at least partially surrounding said projecting portion of said fastening member.

14. An assembly as set forth in claim 1 including a trim retention device attached to a portion of said trim cover material; and said back panel includes a receiving bracket engaging said trim retention device and securing said trim cover material to said back panel, said engagement of said receiving bracket and said trim retention device preventing separation of said trim cover material and said cushion from said seat back frame.

15. An assembly as set forth in claim 14 wherein said trim retention device comprises a thin plate fixedly attached to a distal end of said trim cover material.

* * * * *

UNITED STATES PATENT AND TRADEMARK OFFICE
CERTIFICATE OF CORRECTION

PATENT NO. : 5,879,055
DATED : March 9, 1999
INVENTOR(S) : George E. Dishner, et al.

It is certified that error appears in the above-identified patent and that said Letters Patent is hereby corrected as shown below:

On the title page, item [54]
and col. 1, line 1, change "Automative" to -- Automotive --.

In the claims, Claim 1, lines 18 and 19, change "complemented" to -- complementary --.

Signed and Sealed this

Twenty-sixth Day of October, 1999

*Attest:*

Q. TODD DICKINSON

*Attesting Officer*     *Acting Commissioner of Patents and Trademarks*